United States Patent
Peeters

(10) Patent No.: US 10,635,405 B2
(45) Date of Patent: *Apr. 28, 2020

(54) HOMOGENOUS ATOMIC PATTERN FOR DOUBLE, ADD, AND SUBTRACT OPERATIONS FOR DIGITAL AUTHENTICATION USING ELLIPTIC CURVE CRYPTOGRAPHY

(71) Applicant: Texas Instruments Incorporated, Dallas, TX (US)

(72) Inventor: Eric Thierry Peeters, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,440

(22) Filed: Jul. 13, 2018

(65) Prior Publication Data
US 2019/0034170 A1  Jan. 31, 2019

Related U.S. Application Data

(63) Continuation of application No. 15/590,217, filed on May 9, 2017, now Pat. No. 10,025,560, which is a
(Continued)

(51) Int. Cl.
*G06F 7/72* (2006.01)
*H04L 9/00* (2006.01)
(Continued)

(52) U.S. Cl.
CPC ............. *G06F 7/725* (2013.01); *H04L 9/003* (2013.01); *H04L 9/3066* (2013.01); *H04L 9/3252* (2013.01); *H04L 2209/805* (2013.01)

(58) Field of Classification Search
None
See application file for complete search history.

(56) References Cited

U.S. PATENT DOCUMENTS

| | | | |
|---|---|---|---|
| 4,695,970 A | | 9/1987 | Renner et al. |
| 5,982,895 A | * | 11/1999 | Dworkin .............. G06F 7/726 380/271 |

(Continued)

FOREIGN PATENT DOCUMENTS

| | | |
|---|---|---|
| CN | 101198998 A | 6/2008 |
| CN | 101562522 A | 10/2009 |
| CN | 102546160 A | 7/2012 |

OTHER PUBLICATIONS

Morales-Sandoval et al., "On the Hardware Design of an Elliptic Curve Cryptosystem", Proceedings of the Fifth Mexican International Conference in Computer Science (ENC'04), 0-7695-2160-6/04, 2004.*

(Continued)

*Primary Examiner* — Piotr Poltorak
(74) *Attorney, Agent, or Firm* — Michelle F. Murray; Charles A. Brill; Frank D. Cimino

(57) ABSTRACT

A method of performing finite field addition and doubling operations in an elliptic curve cryptography (ECC) authentication scheme as a countermeasure to side-channel attack. The addition and doubling operations are executed using atomic patterns that involve the same sequence and number of operation types, so that the noise consumption and electromagnetic emanation profile of circuitry performing the operations is identical regardless of operation. A subtraction operation using such an atomic pattern is also disclosed.

17 Claims, 7 Drawing Sheets

Related U.S. Application Data continuation of application No. 14/725,682, filed on May 29, 2015, now Pat. No. 9,645,794.

(60) Provisional application No. 62/053,907, filed on Sep. 23, 2014.

(51) Int. Cl.
   H04L 9/30 (2006.01)
   H04L 9/32 (2006.01)

(56) References Cited

U.S. PATENT DOCUMENTS

| | | | | |
|---|---|---|---|---|
| 6,005,888 | A | 12/1999 | Barron | |
| 6,263,081 | B1* | 7/2001 | Miyaji | G06F 7/725 380/28 |
| 6,397,241 | B1* | 5/2002 | Glaser | G06F 7/722 708/625 |
| 6,567,832 | B1* | 5/2003 | Ono | G06F 7/723 708/606 |
| 7,069,287 | B2 | 6/2006 | Paar et al. | |
| 8,378,942 | B2 | 2/2013 | Vasyltsov | |
| 8,379,842 | B2* | 2/2013 | Vasyltsov | G06F 7/725 380/2 |
| 8,411,855 | B1 | 4/2013 | Robinson et al. | |
| 2001/0048741 | A1* | 12/2001 | Okeya | G06F 7/725 380/28 |
| 2003/0059042 | A1* | 3/2003 | Okeya | G06F 7/725 380/30 |
| 2003/0059043 | A1* | 3/2003 | Okeya | G06F 7/725 380/30 |
| 2003/0156714 | A1* | 8/2003 | Okeya | G06F 7/725 380/30 |
| 2006/0218470 | A1 | 9/2006 | Dickson | |
| 2007/0064931 | A1* | 3/2007 | Zhu | G06F 7/725 380/30 |
| 2007/0064932 | A1* | 3/2007 | Struik | G06F 7/725 380/30 |
| 2007/0156797 | A1* | 7/2007 | Modave | G06F 7/723 708/200 |
| 2007/0244944 | A1* | 10/2007 | Bertoni | G06F 7/725 708/1 |
| 2007/0291937 | A1* | 12/2007 | Katagi | G06F 7/725 380/30 |
| 2008/0019509 | A1* | 1/2008 | Al-Gahtani | H04L 9/003 380/30 |
| 2008/0031444 | A1* | 2/2008 | Vasyltsov | G06F 7/725 380/2 |
| 2008/0260145 | A1 | 10/2008 | Trichina | |
| 2008/0273694 | A1* | 11/2008 | Ebeid | G06F 7/725 380/28 |
| 2008/0285745 | A1* | 11/2008 | Teglia | H04L 9/003 380/29 |
| 2009/0086976 | A1 | 4/2009 | Scian | |
| 2009/0097637 | A1 | 4/2009 | Boscher et al. | |
| 2009/0136022 | A1* | 5/2009 | Langendoerfer | G06F 7/5324 380/28 |
| 2009/0214023 | A1* | 8/2009 | Al-Somani | G06F 7/725 380/28 |
| 2010/0150340 | A1* | 6/2010 | Choi | G06F 7/725 380/28 |
| 2010/0177886 | A1* | 7/2010 | Futa | G06F 7/723 380/28 |
| 2010/0322422 | A1 | 12/2010 | Al-Gahtani et al. | |
| 2011/0200186 | A1 | 8/2011 | Ghouti et al. | |
| 2011/0246789 | A1* | 10/2011 | Feix | G06F 7/723 713/190 |
| 2012/0008780 | A1* | 1/2012 | Al-Somani | G06F 7/725 380/255 |
| 2012/0207299 | A1 | 8/2012 | Hattori et al. | |
| 2013/0016827 | A1* | 1/2013 | Teglia | G06F 7/725 380/28 |
| 2014/0098951 | A1 | 4/2014 | Choi et al. | |

OTHER PUBLICATIONS

Deniz Karakoyuniu, "Efficient Side-Channel Aware Elliptic Curve Cryptosystems Over Prime Fields," Worcester Polytechnic Institute, Aug. 2010 (79 pages).

Bernstein et al., "Faster Addition and Doubling on Elliptic Curves," Department of Mathematics, Statistics and Computer Science, Document ID: 95616567a6ba20f575c5f25e7cebaf83, Jul. 2007 (22 pages).

Franck Rondepierre, "Revisiting Atomic Patterns for Scalar Multiplications on Elliptic Curves," Extended Version, CARDIS 2013 (20 pages).

Giraud et al., "Atomicity Improvement for Elliptic Curve Scalar Multiplication," arXiv: 1002.4569v2, Mar. 2010 (23 pages).

Lee et al., "Size-Efficient Digital Signatures with Appendix by Truncating Unnecessarily Long Hashcode," LNCS 8893, pp. 69-78, Springer International Publishing Switzerland 2014 (10 pages).

Rondepierre, "Revisiting Atomic Patterns for Scalar Multiplications on Elliptic Curves," 12th International Conference on Smart Card Research and Advanced Application Conference (CARDIS 2013) (Springer, 2014) (17 pages).

Standaert et al., "On the Masking Countermeasre and Higher-Order Power Analysis Attacks", Proceedings of the International Conference on Information Technology: Coding and Computing (ITCC, 2005), (6 pages).

Patent Prosecution History for U.S. Appl. No. 15/590,217, from May 9, 2017 to Jun. 28, 2018 (152 pages).

Patent Prosecution History for U.S. Appl. No. 14/725,682, from May 29, 2015 to Apr. 21, 2017 (157 pages).

First Chinese Office Action dated Nov. 1, 2019, Chinese Application No. 201510611781.2, 33 pages.

\* cited by examiner

HOMOGENOUS ATOMIC PATTERN FOR DOUBLE, ADD, AND SUBTRACT OPERATIONS FOR DIGITAL AUTHENTICATION USING ELLIPTIC CURVE CRYPTOGRAPHY

CROSS-REFERENCE TO RELATED APPLICATIONS

This continuation application claims priority to U.S. patent application Ser. No. 15/590,217, filed May 9, 2017, which claims priority to U.S. patent application Ser. No. 14/725,682 (now U.S. Pat. No. 9,645,794), filed May 29, 2015, which application claims the benefit of and priority to Provisional Application No. 62/053,907, filed Sep. 23, 2014, all of which are incorporated herein by reference.

STATEMENT REGARDING FEDERALLY SPONSORED RESEARCH OR DEVELOPMENT

Not applicable.

BACKGROUND OF THE INVENTION

This invention is in the field of data security. Embodiments are more specifically directed to the authentication of digital communications using to elliptic curve cryptography (ECC).

Security of data communications is a significant issue for virtually every type of electronic system, ranging from large-scale systems such as supercomputers to the smallest scale systems, such as embedded processors. Indeed, security is becoming the paramount issue for small scale systems such as the sensors and actuators envisioned for deployment in the "Internet of Things" (IoT). These highly distributed IoT objects, which will be implemented in large numbers over a wide range of services and applications, including health, education, resource management, and the like, can be particularly vulnerable to attack and compromise, given their relatively small computational capacity and remote implementation. However, the importance of the functions carried out by a network of these sensors and actuators raises the security stakes.

Further complicating the security challenge for IoT devices is the significant constraints on power consumption placed on these devices. It is contemplated that many of the sensors, actuators, and other IoT nodes will be remotely powered, whether by way of long life batteries, solar cells at the device, or from the wireless communication signal itself. As such, the power budget that can be devoted to computations involved in authentication of communications, among other security functions such as encryption and decryption, can be quite limited.

Various approaches are known in the field of digital data cryptography, such as may be used for data communications, data storage and retrieval, and other applications. In general, the field of cryptography encompasses data encryption and decryption, digital authentication of digital data (e.g., sign/verify schemes), and the like. Public key cryptography, also referred to as asymmetric cryptography, is a commonly used type of cryptography. According to this approach, a public-private pair of "keys", each key being a block of data or information, are generated according to a particular algorithm. The public and private keys have an inverse relationship with one another based on a generator polynomial, such that the transmitting node secures the communication using one of the keys in the pair, and the receiving node decrypts or verifies the communication using the other key. More specifically, in the data encryption context, a block of data that is encrypted using the public key can be decrypted using the private key; in the authentication context, a digital signature generated using the private key can be verified using the public key. The public and private keys are related to one another via a difficult mathematical problem (commonly referred to as a "trap-door function"), so that it is computationally difficult to determine a private key from knowledge of its corresponding known public key. The public key can thus be published, for example sent by an unsecured communication or listed in a public registry, to enable data communication data between the holder of the private key and those obtaining the public key, without realistic risk that the private key can be calculated by an attacker. The public/private key approach is generally favored because the holder of the private key need not share that key with any other party; in contrast, symmetric key approaches require both parties to know the same encryption key.

The level of security provided by a particular public key scheme corresponds generally to the length of the keys; longer key lengths increase the difficulty of deriving the private key from the public key. Conventional bit lengths for both public and private keys under such cryptography algorithms as "DH", "DSA", and "RSA", range from on the order of 1024 bits to 15360 bits. Of course, the lengths of the keys can vary widely, depending on the desired security level and the available computational capacity of the encrypting and decrypting nodes.

Elliptic curve cryptography ("ECC") is a known type of public key cryptography in which the relationship of the public and private keys is based on the algebraic structure of elliptic curves over finite fields. According to this approach, the trap-door function is the solution of a discrete logarithm, over a finite field. This problem is referred to in the art as the "Discrete Logarithm Problem" (in the case of elliptic curves over finite fields, the "Elliptic Curve Discrete Logarithm Problem" or "ECDLP"), and has proven to be more intractable than the problems on which other public key approaches are based. For example, it is believed that a 160-bit ECC private key will provide an equivalent security level as a 1024-bit RSA private key, and that a 512-bit ECC private key will provide an equivalent security level as a 15,360-bit RSA private key. These shorter key lengths of the ECC approach thus greatly reduce the computational cost of the relevant calculations as compared with RSA-like algorithms.

By way of further background, so-called "side-channel" attacks on data security refer to indirect techniques for identifying a private key. However, so-called "side channel" attacks on data communications seek to obtain the private key value by indirect means. Rather than attempting to recover the payload of encrypted data directly (e.g., deriving the private key from the public key by solving the discrete logarithm problem), side channel attacks obtain information about the actions of the decrypting device in carrying out the decryption process, from which the private key can be inferred.

As fundamental in the art, CMOS digital circuits consume power and emit electromagnetic radiation when switching logic states, but consume little power and emit little electromagnetic energy in the steady-state. One type of side-channel attack in the public-private key context is based on measurements of the power consumption of a device over time, obtained either directly or indirectly from associated electromagnetic radiation, as that device performs calculations involving the private key. Relying on the correlation between the power signature and the amount of computational work being carried out, analysis of this power signature allows the attacker to discern the sequence of "1" and "0" bits in the private key. For example, cryptography calculations according to such algorithms as RSA and ECC involve the multiplication of a data value by the private key by adding the data value to itself the number of times indicated by the private key. In the digital context, this operation is carried out by sequentially interrogating the private key value bit-by-bit and executing calculations depending on the value of that bit. For example, each private key bit that is a "1" may cause one sequence of operations to be executed, while each private key bit that is a "0" may cause a different sequence of operations. By sensing the power consumed by the device over the duration of the private key sequence, the side-channel attacker can detect differences in the computational work between the addition and doubling operations, and from those differences can detect the sequence of "1" and "0" bits in the private key value.

FIG. 1 illustrates an example of a detected side-channel signal reflecting the power consumed by a device over time as it decrypts a block data according to the RSA algorithm. In this operation, a squaring and a multiplication are performed for each "1" value in a bit position of the private key, while only a squaring is performed for each "0" bit value. Because, in this conventional example, the multiplication performed for a "1" private key bit involves more device switching (i.e., a greater number of adds) than the squaring operation requires, the detected noise pattern of FIG. 1 exhibits a wider waveform MULT for multiplications than that of waveform SQUA for the squaring operations. As evident in FIG. 1, this allows the multiplication operations to be readily distinguishable from detecting the emitted noise or power consumption. Because the particular algorithms used for decryption are generally well-known, attackers know that each multiplication noise waveform MULT corresponds to the second operation for a "1" bit in the private key. As a result, this side-channel attack readily detects the bit-by-bit digital values of the private key being used to decrypt received data; for example, the noise pattern of FIG. 1 indicates a portion of the private key as 011010 (the private key bits being applied from LSB to MSB). Knowledge of even a portion of the private key can greatly facilitate the identification of the full private key, and thus the ability to clandestinely recover the communicated payload data.

By way of further background, Rondepierre, "Revisiting Atomic Patterns for Scalar Multiplications on Elliptic Curves", 12th International Conference on Smart Card Research and Advanced Application Conference (CARDIS 2013) (Springer, 2014), pp. 171-86, describes an approach for the protection of elliptic curve scalar multiplications against side-channel analysis, in which doubling and addition are performed so as to have the same computational pattern (i.e., the same side-channel profile). Specifically, the described doubling and addition operations involve eight multiplications, two squaring operations, and ten additions (including subtractions—which have the same computational cost as an addition), all performed in the same order. This article also describes a subtraction operation performed by the same sequence of operations, as may be used in alternative algorithms for finite field scalar multiplication.

BRIEF SUMMARY OF THE INVENTION

Disclosed embodiments provide a solution to the technological problem of efficiently authenticating a data communication with reduced side-channel detectability of the private key.

Disclosed embodiments provide a method for performing elliptic curve cryptography (ECC) signature and verification operations, and a system for performing that method in which improved efficiency is attained.

Disclosed embodiments provide such a method and system that provides a countermeasure to side-channel attacks.

Disclosed embodiments provide such a method and system that can be readily implemented into conventional authentication algorithms and systems.

Disclosed embodiments provide such a method and system that is suitable for use in low-power distributed devices such as networked sensors and actuators.

Other objects and advantages of the disclosed embodiments will be apparent to those of ordinary skill in the art having reference to the following specification together with its drawings.

According to certain embodiments, a register-based programmable processor executes an elliptic curve cryptography (ECC) sign/verify algorithm in which the computational sequences for doubling and addition operations follow matched sequences of no more than ten multiplications and eight additions.

DETAILED DESCRIPTION OF THE INVENTION

One or more embodiments are described in this specification as implemented into a distributed computing system, such as a sensor, controller, or other "Internet of Things" ("IoT") communications node, as it is contemplated that such implementation of those embodiments is particularly advantageous in such a context. However, it is also contemplated that concepts of this invention may be beneficially applied to in other applications, for example mobile telephone handsets and other mobile devices, laptop computers and other personal computer systems, and other devices that are tasked with decrypting encrypted data. Accordingly, it is to be understood that the following description is provided by way of example only, and is not intended to limit the true scope of this invention as claimed.

Figure 2:
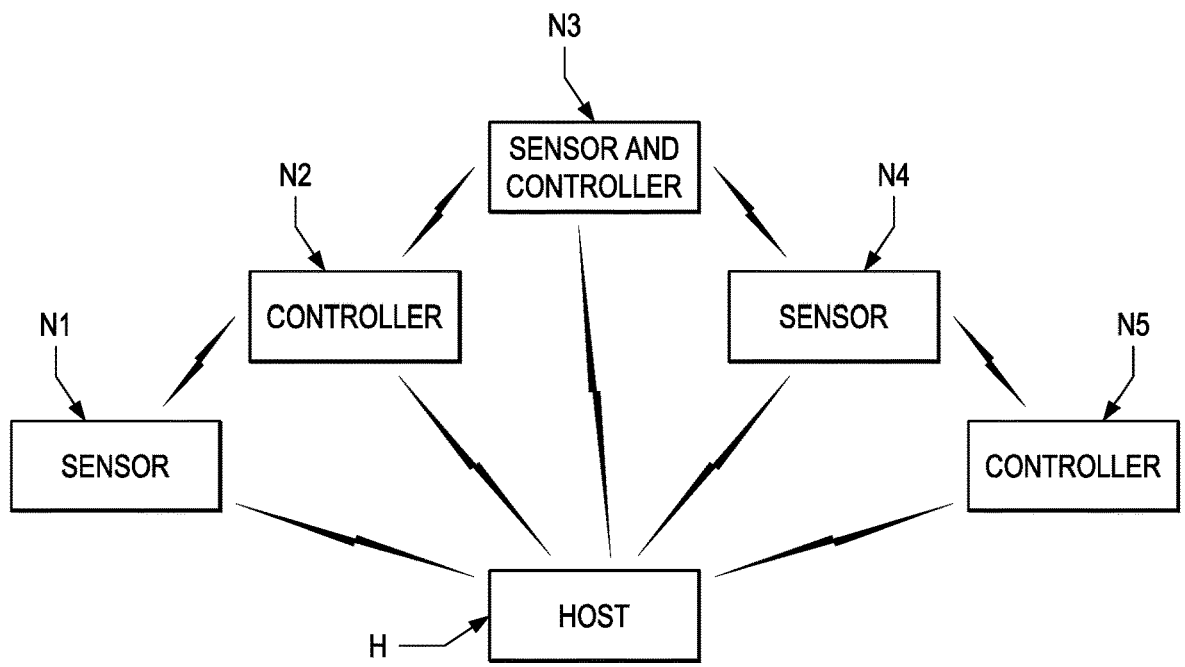
FIG. 2 is an electrical diagram, in block form, of an installation of a distributed networked system of controllers and sensors, in which embodiments of this invention are implemented.

FIG. 2 is a block diagram illustrating a distributed network system in which embodiments of this invention may be deployed. As known in the art, some modern networked systems consist of a number of sensors and controllers that contain significant computational capacity and that are capable of communicating with one another, for example by way of wireless communications. The number of nodes (i.e., the sensors, controllers, or both) in such a network can range from several nodes to on the order of hundreds, depending on the particular application. Such networks have become attractive in the contexts of facilities management (e.g., for environmental control and security management) and industrial control (e.g., control of motors and valves).

In the high-level example of FIG. 2, several nodes N1 through N5 are illustrated as in communication with one another and with host H. Typically, as discussed above, these nodes N1 through N5 (collectively referred to in this specification, in general, as nodes N) are contemplated to be deployed at various locations in a facility or environment, for example at locations in one or more rooms of a facility, at various locations outdoors, and at one or more pieces of industrial equipment. In the example of FIG. 2, nodes N1, N4 serve only or primarily as sensors, nodes N2, N5 serve only or primarily as controllers (e.g. actuators), and node N3 performs both a sensor and a controller function. For purposes of this description, the term "node" will refer to an installed electronic system or sub-system capable of serving as a sensor, or as a controller, or both, and that has a communications function for communicating with other nodes, and perhaps a host system, in a networked arrangement. In any case, the number of nodes performing particular functions in the overall network can vary. According to embodiments and as will also be described below, each of nodes N include computational circuitry, such as a microcontroller, microprocessor, or other large-scale programmable logic.

Host H is also present in this network. Host H is realized by a computer system, such as a computer or workstation installed at or near the facility or environment at which nodes N are placed. Alternatively, host H may be a portable computing system, such as a laptop or tablet computer, smartphone, or the like, that is temporarily in the vicinity of nodes N. In this example, as is typical, host H includes sufficient computational capacity and memory to allow it to install and possibly modify program code at the various nodes N.

As shown in the example of FIG. 2, host H and nodes N1 through N5 are in wireless communication with one another, with host H in communication with each node N, and various ones of nodes N1 through N5 in communication with at least one if not all of the others of nodes N1 through N5. In the case of wireless communication, the manner in which such communication is carried out may follow any one of a number of conventional protocols and physical layer standards, including IEEE 802.11a/b/g/n etc., Bluetooth, and Bluetooth 4.0 (i.e., Bluetooth Low Energy, or "BLE"). Alternatively, some or all of host H and nodes N1 through N5 may be connected in a wired network, e.g. Ethernet. In any case, conventional routers, switches, access points, and the like (not shown) for enabling such communications among nodes N1 through N5 and host H will typically be present.

Figure 3:
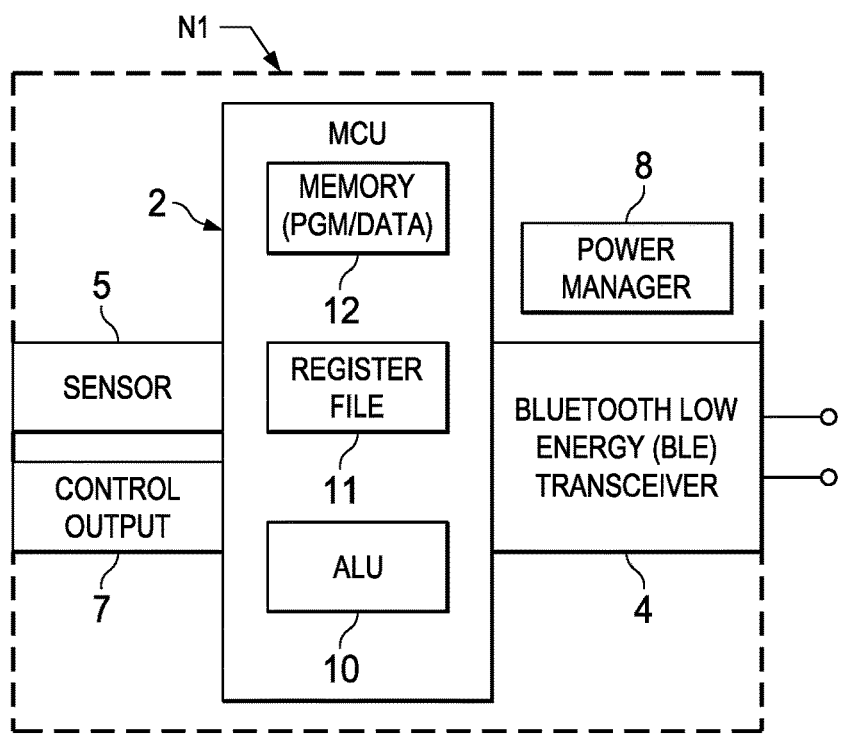
FIG. 3 is an electrical diagram, in block form, of a host system and two nodes in the system of FIG. 2, according to an embodiment of the invention.

FIG. 3 illustrates, by way of example, the high-level architecture of node N1 according to an embodiment. The other nodes N2 through N5 may be constructed by a similar architecture or by way of alternative architectures; in any case, it is contemplated that the specific hardware used to realize may differ among nodes N. It is contemplated that those skilled in the art having reference to this specification will be readily able to implement the hardware necessary and useful to realizing the architecture applicable to embodiments of this invention as suitable for a particular application, without undue experimentation.

Node N1 in this embodiment of the invention corresponds to a programmable subsystem including embedded microcontroller unit (MCU) 2 in combination with various peripheral functions. It is contemplated that node N1 will be typically be physically realized by way of a single circuit board on which MCU 2 will be mounted, along with other integrated circuits and discrete components as appropriate for the desired functions of node N1, with this circuit board typically being housed in the appropriate housing or enclosure suitable for its environment. Alternatively, node N1 may be realized by way of multiple circuit boards, or a single integrated circuit, or as a part of a larger electronic system, depending on its functionality.

In this example, node N1 includes several other functions in addition to MCU 2. Communications with other nodes N3 and host H is carried out by way of BLE function 4, which is realized in the conventional manner for Bluetooth communications in this example and coupled to MCU 2 within node N1. Of course, the communications function within node N1 may be alternatively communicate over wireless LAN (802.11x), over cellular wireless communications facilities, or over Ethernet or other wired communications facilities. Each node N in this networked system also includes one or more input/output functions for interacting with the physical environment external to that node. In this example, node N1 includes sensor function 5 and control output circuit 7, each coupled to and controlled by MCU 2. The particular numbers and functions of input/output functions (i.e., sensor functions 5 and control output circuits 7) will depend on the conditions and operations that node N1 is to carry out in the networked system. Examples of sensor function 5 suitable for use in facilities management and industrial control include temperature sensors, motion sensors, humidity sensors, transducers of various types as suitable in industrial instrumentation, cameras, thermal imaging sensors, photosensors, and the like. Control output circuit 7 corresponds to a conventional driver or other circuit of the appropriate output power for the desired output or control function of node N1. Examples of control output circuit 7 suitable for use include analog output driver circuitry, serial and parallel digital outputs, pulse-width-modulated (PWM) output driver circuitry, driver circuitry for an alarm or an annunciator, and LED drivers, to name a few. The number of each of sensor functions 5 and control output circuits 7 will vary according to the desired function of node N1. If the designer of the network wishes for node N1 to serve only as a sensor node, then one or more sensor functions 5 and no control output circuitry 7 will be realized within node N1; conversely, if node N1 is to serve only as a controller node, then one or more control output circuits 7 and no sensor functions 5 will be included. In many cases, it is contemplated that one or more of each of sensor functions 5 and control output circuits 7 will be installed within node N1.

Figure 1:
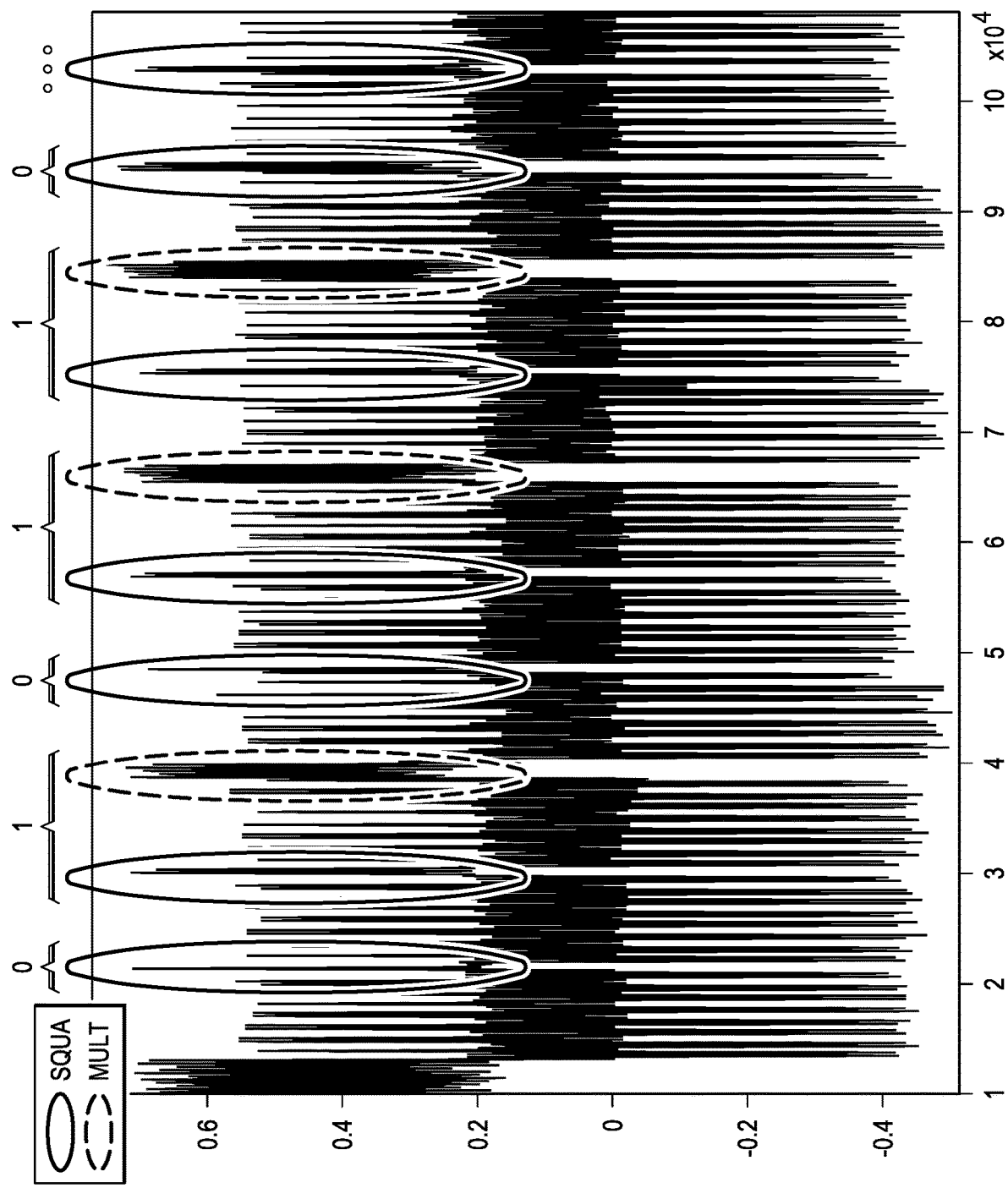
FIG. 1 is a plot of a side-channel signal emitted by a device carrying out a conventional cryptography operation involving a private key, illustrating differences between "1" and "0" bits in the private key.

In this embodiment of the invention, node N1 includes power manager function 8, which controls the powering of the various functions within node N1. It is contemplated that node N1 may be powered in any one of a number of ways, examples of which include wired power (e.g., power over USB, DC output from a rectifier or micro-grid), battery power, solar power, wireless power transfer (e.g., over the wireless communications facility or separately), and the like. In any case, but especially in the battery or wireless power situations, power consumption by MCU 2 and the other functions of node N1 is often of concern in the distributed network architectures shown in FIG. 1.

In this embodiment, MCU 2 in node N1 is configured to include certain functions particular to the construction and operation of this embodiment of the invention, specifically in connection with the security of data communications between its node N1 and the other nodes N and host H in the network of FIG. 2. In particular, it is contemplated that programmable logic circuitry will be implemented within MCU 2, such as logic circuitry programmed to execute program instructions as may be stored in memory resource 12 or received over the communications facility (via BLE transceiver 4, for example). In some embodiments, this programmable logic is in the form of any one of a number of microcontroller or microprocessor devices available in the industry. For example, at least a portion of this programmable logic is represented by ALU 10, which operates in combination with register file 11 and memory resource 12, all of which are implemented within MCU 2 in the architecture shown in FIG. 3. The particular circuitry included within ALU 10 and other logic circuitry in MCU 2 will depend on the particular architecture. Examples of microcontrollers suitable for use as MCU 2 in node N1 include those of the C2xxxx and CORTEX microcontroller families available from Texas Instruments Incorporated. Other microcontrollers and microprocessors of similar computational capacity, or custom logic circuitry, may alternatively be used for MCU 2, so long as adequate computational capacity is provided. It is contemplated that those skilled in the art having reference to this specification will be readily able to select and implement the appropriate device or circuitry for use as MCU 2 for the particular application.

In this example, memory resource 12 will store both program instructions executable by ALU 10, and also data upon which ALU 10 carries out those program instructions. However, the particular arrangement of memory resource 12 can vary, for example as realized by multiple memories within MCU 2, or one or more memories external to MCU 2 but still implemented within node N1. According to embodiments of the invention, memory resource 12 may be realized by a variety of memory technologies, including either or both of volatile memory (e.g., static random-access memory) and non-volatile memory (e.g., flash memory). Program and data memory may occupy separate memory address spaces, or may be contained within a single memory space. For the example of MCU 2 implemented as a C2xxx microcontroller, a modified Harvard architecture is employed by way of which program and data occupy separated regions of a global memory address space, but can be accessed by way of separate hardware pathways.

Node N1 and MCU 2 are also contemplated to include other circuitry and functions beyond those shown in FIG. 3, such other circuitry and functions suitable to its functionality as a stand-alone microcontroller. Examples of such other circuitry and functions input and output drivers, analog-to-digital converters, digital-to-analog converters, clock circuits, voltage regulators, among others. These circuits may be also involved in the operation and execution of program instructions by MCU 2 and the other functions of node N1. It is contemplated that those skilled in the art having reference to this specification will readily comprehend other necessary support circuitry included within MCU 2.

Networked systems, particularly those in which nodes may be deployed remotely from one another and from the host, are vulnerable to security breaches. In particular, communications among the nodes are vulnerable to both detection (i.e., snooping) and also to insertion of unauthorized program code and data (e.g., viruses and bots). As such, the security of communications among the nodes in a networked system such as that shown in FIG. 2 is critical to most applications. An attractive approach for implementing such security is an authentication scheme, for example in which the transmitting node generates a digital signature that is communicated with the "payload" (the actual data being communicated), and the receiving node verifies the signature to authenticate the transmission.

Figure 4A:
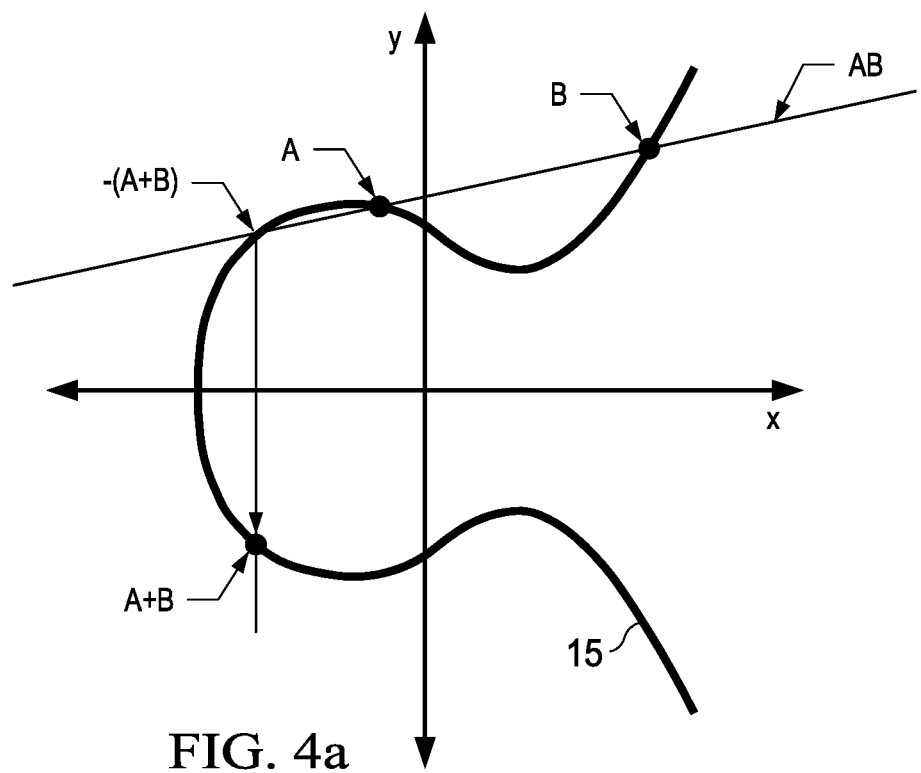
FIGS. 4a and 4b are plots of an elliptic curve illustrating geometric addition and doubling operations, over the set of real numbers.
Figure 4B:
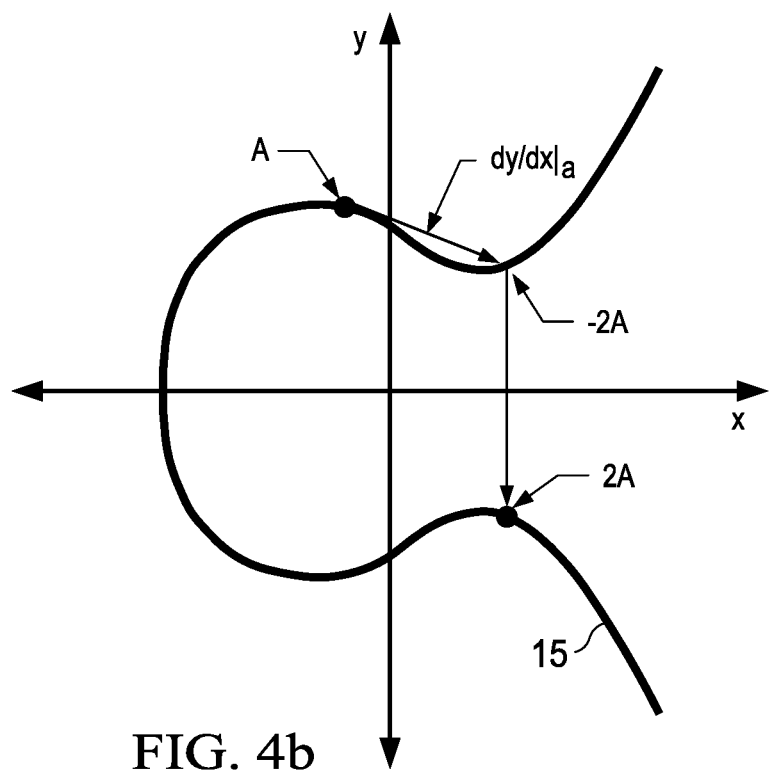

According to these embodiments of the invention, elliptic curve cryptography ("ECC") is involved in the authentication process for communications among nodes N of the system of FIG. 2. ECC is a known type of public key cryptography in which the relationship of the public and private keys is based on the algebraic structure of elliptic curves over finite fields. In a general sense, the finite field is defined by a set of integer points (x, y) that satisfy a particular elliptic curve equation, such as the well-known short Weierstrass form:

$$y^2 = x^3 + ax + b$$

over a Galois field GF(p), p being a relatively large prime integer (e.g., on the order of $10^{75}$, or a digital word of a length on the order of 160 to 256 bits). Curve 15 of FIGS. 4a and 4b illustrate an example of this elliptic curve for particular values of coefficients a, b over all real numbers. In the finite field GF(p) implementation of these embodiments, the points on the actual elliptic curve will be discrete points, modulo p, and as such will not have the smooth shape shown in FIGS. 4a and 4b. For large values of p, the number of points satisfying the applicable Weierstrass equation for selected values of coefficients a, b approaches p. The ECC public-private key pair is based on a cyclic group of m points on the elliptic curve that are multiples, according to the applicable finite field arithmetic, of a public generator point G=(x, y) satisfying the short Weierstrass equation, modulo p. This cyclic group is a subset of the full set of discrete points satisfying the elliptic curve equation, modulo p. The applicable finite field arithmetic defines operations, such as addition and doubling, by way of which points on the curve and in the set are combined to produce another point in the cyclic group.

In the authentication process, as will be described in further detail below, the node transmitting a message (i.e., the payload data being communicated) generates a digital signature that is communicated along with the message to the receiving node; the receiving node executes a sequence of operations, using the public key, to verify that digital signature and thus authenticate the communication and allow the message to be "trusted". As will be described in detail below, generation of the signature according to conventional ECC authentication involves the finite field multiplication of the generator point G by an random scalar value r selected from over a large range of possible values (e.g., where r is a random 256-bit digital value). This multiplication is performed over the cyclic group of m points that satisfy the elliptic curve equation over GF(p), by adding the point G with itself r times. In some embodiments, this multiplication is executed digitally by performing a finite-field addition followed by a finite-field doubling for each "1" bit value in the random value r, and performing only the finite-field doubling with no addition for each "0" bit value in the random value r.

FIGS. 4a and 4b illustrate examples of the operations of geometric addition and geometric doubling for a finite field satisfying short Weierstrass elliptic curve 15, according to conventional ECC algorithms. FIG. 4a illustrates the geometric addition of point A and point B. Systems of equations consisting of an elliptic equation of the short Weierstrass form and an equation of a line will have three non-trivial solutions. As such, any line intersecting curve 15 of FIG. 4a does so at three and only three points. This property is used in the geometric addition operation. As shown in the example of FIG. 4a, the geometric addition of point A and point B is performed by identifying the third point on line AB on which both points A and B lie as the point −(A+B), of which the sum at point A+B is the negative in the y-dimension. FIG. 4b illustrates the geometric doubling of point A by identifying the point −2A on curve 15 intersected by the tangent line $(dy/dx)|_A$ to curve 15 at point A, of which doubled point 2A is the negative in the y-dimension. As will be evident from the following description, these geometric additions and multiplications are used in ECC encryption and decryption.

In conventional ECC algorithms, the internal CPU operations for an addition differ from those for a doubling. As such, similarly as in the case of the RSA algorithm illustrated in FIG. 1, this difference enables a side-channel attacker to detect additions interspersed among the doubling operations in the noise pattern, with each addition indicating a "1" bit in the random value r. This renders the authentication vulnerable, because knowledge of the random value r used to generate a particular digital signature enables calculation of the private key k, and knowledge of the private key k in turn enables the attacker to falsify digital signatures as though issued from that transmitting node.

Embodiments of this invention enable the execution of finite field operations involved in private key authentication according to an ECC algorithm using scalar finite field operations that are identical, from a power and noise standpoint, over the bit values of the scalar. More specifically, these embodiments execute addition operations that exhibit an identical power and noise signature as do doublings, which prevent a side-channel attacker from readily distinguishing additions from doublings, and thus prevent the attacker from distinguishing the "1" and "0" bit values being applied as the scalar value. Furthermore, these embodiments implement these operations in a particularly efficient manner, requiring fewer low-level operations than conventional techniques. As such, these embodiments provide effective and efficient countermeasures to side-channel attacks, as will now become apparent from the following description.

Figure 5:
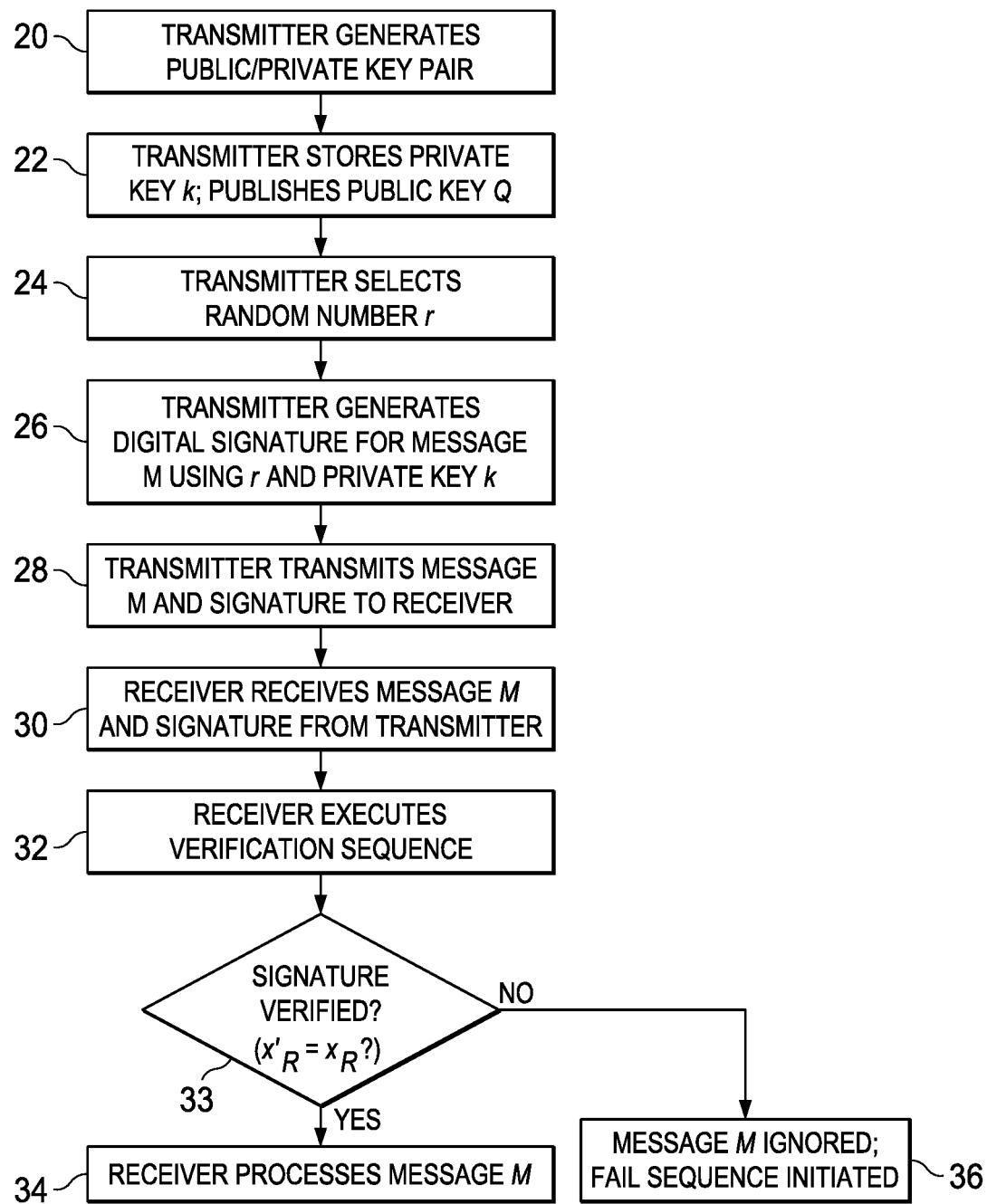
FIG. 5 is a flow diagram illustrating the operation of nodes in a networked system in carrying out authenticated communication according to embodiments of the invention.

Referring now to FIG. 5, the operation of a transmitting node (or transmitter) in a networked system communicating authenticated data to a receiving node (or receiver) in that system, and the operation of the receiving node in authenticating or verifying that communication, will now be described according to an embodiment. The transmitting node and receiving node in this embodiment may be nodes within a networked system of sensors, controllers, and host systems such as described above relative to FIG. 1; in that situation, it is contemplated that any one of the various nodes N may serve as either the transmitting node or receiving node, with some or all of those nodes N serving as both a transmitting node and a receiving node over time. Alternatively, it is contemplated that these embodiments may be implemented in connection with other types of data communication, such as may be performed between computers or other digital systems including smartphones and other mobile devices in carrying out digital communications over a local or wide area network. Particular examples in this regard include the retrieval of encrypted data from storage in the so-called "cloud", and the communication of identifying information such as involved in financial and other security-sensitive uses. Other applications for the authentication of communicated data will be apparent to those skilled in the art.

In any case, it is contemplated that the authentication and verification operations of the transmitting node and receiving node, respectively, according to these embodiments will be carried out by the various computational resources within the particular nodes involved. For example, if sensor node N1 in the system of FIG. 2 is functioning as the transmitting node for measurements from its sensor 5 to controller node N2, the processes involved in authentication and arrangement of the sensor measurements will be largely carried out by MCU 2 in node N1, for example by its ALU 10 executing program instructions stored in its memory resource 12, and the processes involved and verifying and processing the received data will be largely carried out by MCU 2 in node N2, each in conjunction with its BLE transceiver 4 in the physical transmission and receipt of wireless communication signals. Of course, other nodes such as host H will include different computational hardware for performing the authentication and verification processes. As such, it is contemplated that those skilled in the art having reference to this specification will be readily able to implement the functions and operations described herein according to the computational resources desired for particular implementations.

In process 20, the transmitting node generates the private/public key pair to be used for the authentication of data to be communicated. In this embodiment, authentication will be carried out according to an elliptic curve cryptography (ECC) approach in which the relationship of the public and private keys is based on the algebraic structure of elliptic curves over finite fields. As noted above, the finite field is defined as a cyclic group of points (x, y) that satisfy a selected elliptic curve equation, such as the well-known short Weierstrass form:

$$y^2 = x^3 + ax + b$$

over a Galois field GF(p), p being a relatively large prime integer (e.g., on the order of $10^{75}$, or a digital word of a length on the order of 160 to 256 bits). In the finite field arithmetic operations, such as addition and doubling, that are implemented in these embodiments, points on the curve and in the set are combined to produce another point on the curve and in the selected cyclic group.

The generation of an ECC public-private key pair in process 20 thus begins with the identification of an elliptic curve of agreed or pre-selected parameters, and a public generator point G=(x, y) in GF(p) that is in the desired cyclic group of n points that satisfies the selected elliptic curve (i.e., n is the order of the elliptic curve). In this cyclic group, n is the identity element, in that the multiplication n·G returns generator point G as the product (i.e., n·G=G).

Typically, the particular elliptic curve equation (e.g., in the case of the short Weierstrass equation, the specific values of the coefficients a, b) and the generator point G are determined from an applicable standard for the authentication algorithm. A public key Q is a point in the cyclic group that is the geometric product of the generator point G by a scalar k, which is the corresponding private key. As such, in process 20, the transmitting node (i.e., the node that will be generating the digital signature) will multiply generator point G by a private key k selected by the transmitting node, according to the appropriate finite field arithmetic, to arrive at the public key Q:

$$Q = k \cdot G$$

over GF(p). While the generation of a public key Q from a known private key k and generator point G is computationally straightforward, the converse problem of computing the value of the private key k from the known generator point G and public key Q is an extremely difficult computational problem. The difficulty of this converse problem, resulting from the "trap-door" nature of the computations involved in the generation of the private/public key pair, provides the level of security of this digital signature approach.

In process 22, the transmitting node locally stores its private key P, and communicates the public key Q to the receiving node. Typically, processes 20, 22 are performed in advance by the transmitting node, rather than for each communication; as known in the art, public registries are available for publicly storing the public keys for its users, so that receiving nodes can readily receive secure transmissions without specifically requesting a public key from the sender.

Preparation of a signed message begins with process 24, in which the transmitting node selects a random number r for use in generation of the digital signature $(x_R, s)$ to accompany the message M According to these embodiments, random number r is an integer selected from a large range of integers, for example over the range [1, n−1] where n is on the order of $2^{256}$ (i.e., random number r is a randomly selected n-bit binary number). The level of security of the authentication provided by these embodiments is largely determined by the order of the elliptic curve, i.e. the value of n, with larger values of n invoking stronger security.

Figure 6A:
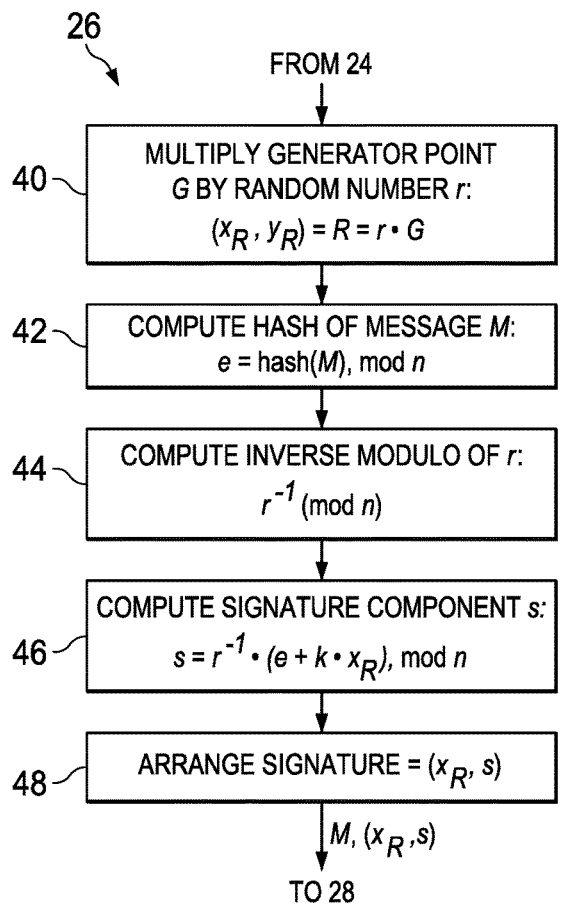
FIG. 6a is a flow diagram illustrating the generation of a digital signature in the process of FIG. 5.

In process 26, the transmitting node generates the digital signature $(x_R, s)$ for message M using the private key value k and the random number r selected in process 24. Referring now to FIG. 6a, a general description of signature generation process 26 according to this embodiment will now be described.

Signature generation process 26 begins with process 40, in which the multiplication of generator point G by the random number r selected in process 24 is executed. By convention, generator point G is the same point on the selected elliptic curve and in the selected cyclic group of n points as involved in the generation of public key Q in process 20. Because this multiplication is thus a scalar (random number r) multiplication of a point in the cyclic group on the elliptic curve (generator point G), multiplication process 40 is executed according to the applicable finite field arithmetic. The particular manner in which this scalar multiplication is performed according to these embodiments will be described in further detail below.

In process 42, the transmitting node computes a hash of message M, modulo n (n being the number of elliptic curve points in the cyclic group based on generator point G). As known in the art, the hash of process 42 is carried out according to an agreed-upon mapping function for the particular ECC authentication and verification used in the communication of messages among the nodes of the system. The result of hash process 42 is hash e of message M, modulo n. In process 44, the multiplicative inverse, modulo n, of the random number r is computed by the transmitting node in a conventional manner. As known in the art, this modulo multiplicative inverse $r^{-1}$ (mod n) is the integer for which the product of $r^{-1}$ and random number r equals 1, modulo n. As such, r and $r^{-1}$ are coprime.

Upon computation of hash e and inverse $r^{-1}$ in processes 42 and 44, respectively, process 46 is then executed at the transmitting node to compute one component of the digital signature to be communicated with message M. This component s is defined as:

$$s = r^{-1} \cdot (e + k \cdot x_R), \bmod m$$

In process 48, the transmitting node arranges the full digital signature as the pair of components $(x_R, s)$. In process 28 (FIG. 5), the appropriate circuitry in the transmitting node (e.g., BLE transceiver 4 in node N1) arranges, modulates, and transmits this digital signature $(x_R, s)$ along with message M to the receiving node, over and according to the applicable communications facility. According to this implementation, neither the message M nor the digital signature $(x_R, s)$ need be encrypted in order for authenticated communications (i.e., verifiable as actually transmitted by the transmitting node) to be carried out. The security of digital signature $(x_R, s)$ is because signature component s is calculated from two integer values, namely the inverse $r^{-1}$ and private key k, that are not known (including by the receiving node) and that cannot be derived from the value of component s; the single equation defining component s has these two unknowns and thus no single solution.

The verification carried out at the receiving node begins with the receipt of message M and digital signature $(x_R, s)$, in process 30 of FIG. 5. This process 30 also includes the appropriate demodulation, filtering, and other conventional operations involved in the receiving and decoding of incoming signals over the applicable communications facility. In process 32, the appropriate circuitry (e.g., MCU 2 in node N2) executes a verification sequence upon the received message M and digital signature $(x_R, s)$ to ensure that the message M was received from a trusted source and can thus be safely acted upon.

Figure 6B:
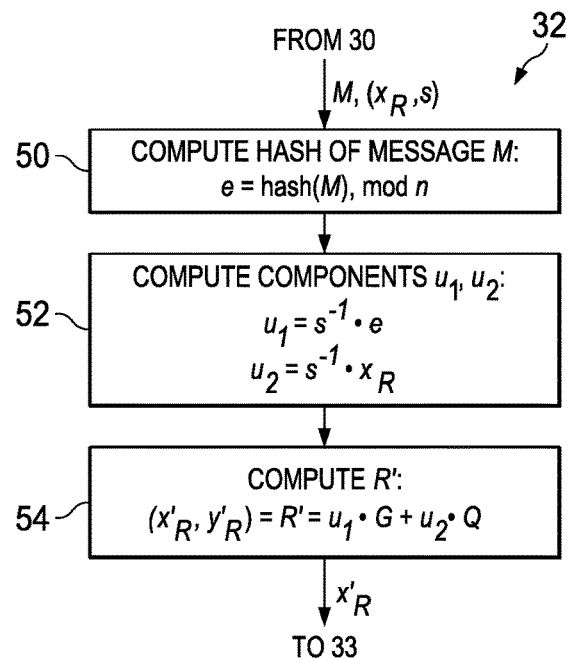
FIG. 6b is a flow diagram illustrating the verification of a digital signature in the process of FIG. 5.

Referring now to FIG. 6b, signature verification sequence 32 according to this embodiment will now be described in detail. The goal of verification sequence 32 is to compute a value $x'_R$ from the received message M and digital signature $(x_R, s)$ using public key Q, and then compare that value $x'_R$ with the true value of $x_R$ that was received as one component of the digital signature $(x_R, s)$. The digital signature is verified if value $x'_R$ is equal to the true value $x_R$.

Verification sequence 32 begins with the computation of hash e from the received message M, in process 50. The mapping function applied in process 50 is the same as used by the transmitting node in process 42, and as such the same result of hash e is produced. In process 52, two component values $u_1$, $u_2$ are computed by the computational circuitry in the receiving node, based on known values. More specifically, in this embodiment, the two component values $u_1$, $u_2$ are calculated as:

$$u_1 = s^{-1} \cdot e$$

$$u_2 = s^{-1} \cdot x_R$$

The value $s^{-1}$ is the multiplicative inverse modulo n (i.e., where n is the size of the cyclic group including generator point G), calculated in the conventional manner, and $x_R$ is the corresponding component of the received digital signature ($x_R$, s).

In process 54, the receiving node computes a point R' on the elliptic curve, and in the cyclic group including generator point G. This x-coordinate of this point R' is the integer value $x'_R$ used in the verification decision. According to this embodiment, the computation of process 54 applies generator point G and public key Q as follows:

$$(x'_R/y'_R)R' = u_1 \cdot G + u_2 \cdot Q$$

Upon completing the calculation of process 54, verification decision 33 (FIG. 5) can then be performed by the receiving node, by comparing the value of $x'_R$, the x-component of point R', calculated in process 54, with the component value $x_R$ received in the digital signature ($x_R$, s). If the two values match (decision 33 returns a "yes" result), the digital signature ($x_R$, s) is verified, and the message M can then be trusted by the receiving node and processed by MCU as appropriate in process 34. Conversely, if the two do not match (decision 33 returns a "no" result), the digital signature ($x_R$, s) is not verified. Either an imposter node has transmitted message M, or an error occurred during transmission. The receiving node then ignores the received message M as untrustworthy or corrupted, and initiates the appropriate fail process in process 36.

As mentioned above, the security of the authentication sequence described above is largely based on the component s of the digital signature ($x_R$, s) including two integer values, namely the inverse $r^{-1}$ and private key k, that are neither known at the receiving node nor can be determined by "snooping" the transmission between the transmitting and receiving nodes, because the defining equation for component s is essentially a single equation with two unknowns. Conversely, however, if an attacker could detect one of those values by way of a side-channel attack, the equation can be solved and the security of the authentication defeated. Ultimately, if an attacker can derive private key k, that attacker could forge digital signatures that would be successfully verified by an unsuspecting receiving node. System operation could then be readily disrupted.

Referring to signature generation process 26 and verification sequence 32 of FIGS. 6a and 6b, certain operations are particularly vulnerable to side-channel attacks based on detection of noise and power as described above relative to FIG. 1. These operations include the scalar multiplication of generator point G by random number r in process 40. As noted above, one of the two unknowns in the equation for component s of the digital signature ($x_R$, s) is the inverse $r^{-1}$; knowledge of random number r (from which its inverse $r^{-1}$ can be readily calculated) would yield private key k. As such, the multiplication of generator point G by random number r in process 40 of signature generation process 32 is a particularly interesting point of side-channel attack, especially since this multiplication is a scalar multiplication carried out by finite field arithmetic, and is thus typically performed by way of a sequence of doublings and additions as described above in connection with FIG. 1.

According to these embodiments, however, additions, doubling, and other operations involved in finite field scalar multiplication, such as performed in process 40, are arranged so that these operations appear largely identical to side-channel attackers, by exhibiting similar power signatures over time (i.e., a similar "side-channel signal"). More specifically, if doublings and additions cannot be distinguished from one another in a side-channel attack, the attacker will be unable to distinguish "1" bits from "0" bits in the sequence of the scalar involved in the multiplication.

Figure 7:
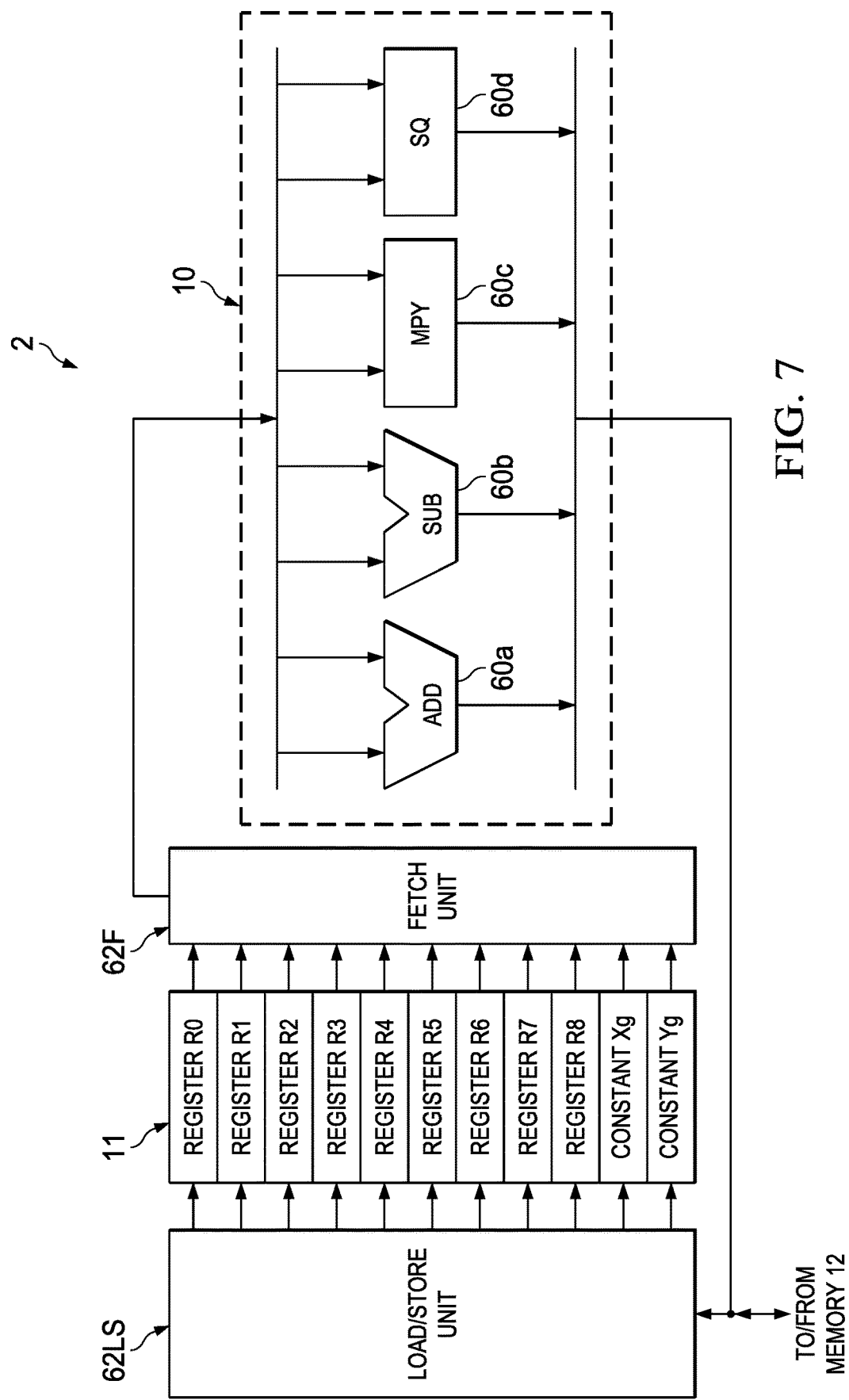
FIG. 7 is an electrical diagram, in block form, of a portion of an MCU in a node in the system of FIG. 2, in which embodiments of the invention may be implemented.

By way of example, FIG. 7 illustrates a generic arrangement of a portion of MCU 2 as suitable for use in a transmitting node according to these embodiments. The architecture shown in FIG. 7 includes register file 11, which in this embodiment includes nine register locations R0 through R8 and two additional register locations for storing constant values Xg, Yg. As will be described in further detail below relative to the operation of MCU 2 in process 40, these locations of register file 11 will be involved in the execution of addition and doubling operations according to this embodiment. It is of course contemplated that register file 11 may also include other storage locations as used in connection with other functions in the authentication sequence and otherwise in the operation of the node; in addition, it is contemplated that each of the register locations illustrated in FIG. 7 may also be re-used as appropriate for those other operations. For purposes of this description, the architecture of FIG. 7 includes fetch unit 62F, which retrieves the contents of those selected register locations of register file 11 for application to ALU 10; this architecture also includes load/store unit 62LS, which stores values generated by ALU 10 in the appropriate locations of register file 11, and which also loads register file 11 with data from memory 12 as shown.

The architecture shown by way of example in FIG. 7 also includes some of the operational circuitry of ALU 10, namely adder circuit 60a, subtractor circuit 60b, multiplier circuit 60c, and squaring circuit 60d. Each of these circuits 60a through 60d execute a specific circuit function for carrying out the low-level calculations involved in the finite field scalar multiplication described below, although the particular hardware arrangement of ALU 10 may differ from that shown in FIG. 7. For example, subtractor circuit 60b may not be realized separately from adder circuit 60a, but may be implemented by adder 60a in combination with the appropriate circuitry for applying the complement (e.g., 2's complement) of the appropriate operand in a subtraction. Other variations on this architecture are also contemplated, and may be readily realized by those skilled in the art having reference to this specification.

It is of course contemplated, as noted above, that a wide range of computing architectures may be used to carry out these embodiments, as will be appreciated by those skilled in the art having reference to this specification. For example, in the alternative to register file 11 shown in FIG. 7, ALU 10 may receive and store its operand data in addressable data memory, for example including one or more levels of cache memory. As such, the architecture shown in FIG. 7 is provided by way of example only, and for the clarity of the description of one embodiment of the finite field scalar multiplication operation that will now be described in connection with FIG. 8.

The finite field scalar multiplication as shown by way of example in FIG. 8 will be described with reference to the multiplication of generator point G by random number r as described above relative to process 40 of FIG. 6a, considering that this scalar multiplication is a particularly vulnerable operation in ECC authentication, for the reasons discussed above. This same multiplication approach can also be used for other finite field scalar multiplications of elliptic curve points, such as those carried out in process 54 in the verification of the digital signature, and in other processes and authentication or encryption/decryption algorithms.

According to this embodiment, processes 60, 62 are performed to store respective operands r, G for this finite field scalar multiplication. In process 60, random number r is stored in a bit-accessible storage location available to logic circuitry within ALU 10. In this embodiment, random number r is a digital value of t bits, where t is a relatively large prime number as discussed above in connection with process 24 (FIG. 5). In process 62, the x and y coordinates (i.e., the affine coordinates) of generator point G are stored for later access. In the example of the MCU architecture shown in FIG. 7, two register locations (labeled CONSTANT Xg and CONSTANT Yg) are provided by register file 11, for the storing of the affine coordinates of generator point G in process 62. As will be described in detail below, these values are not altered throughout the execution of the finite field multiplication.

According to this embodiment, the finite field scalar multiplication process can performed by a computer or microprocessor (MCU 2 in this example) executing the appropriate program instructions. As known in the ECC art, common digital algorithms for performing the finite field scalar multiplication of an elliptic curve point involve the sequential adding and doubling of the digital value of that multiplicand, depending on the bit value of each bit position in the scalar multiplier, taken in sequence. For the case of the multiplication of generator point G by random number r, the resulting product R is generated by adding the digital value G to itself r times. According to this embodiment, one example of such an algorithm for this multiplication, where random number r is in the form of a t-bit digital value, is provided by the pseudocode sequence:

```
R ← G                    # initialize result R to the projective coordinates of
                           point G for r_{t-1}=1
for i from t-2 to 0, step = -1 : # for each bit position in P, beginning with 2^{nd} MSB
    R ← 2R                  # double result R from prior bit (2^{i+1})
    position
    if r_i = 1, then R ← R + G    # add G to accumulator for "1" bit in r_i
    loop           # decrement index i = i - 1
return R           # output the product point R
```

Figure 8:
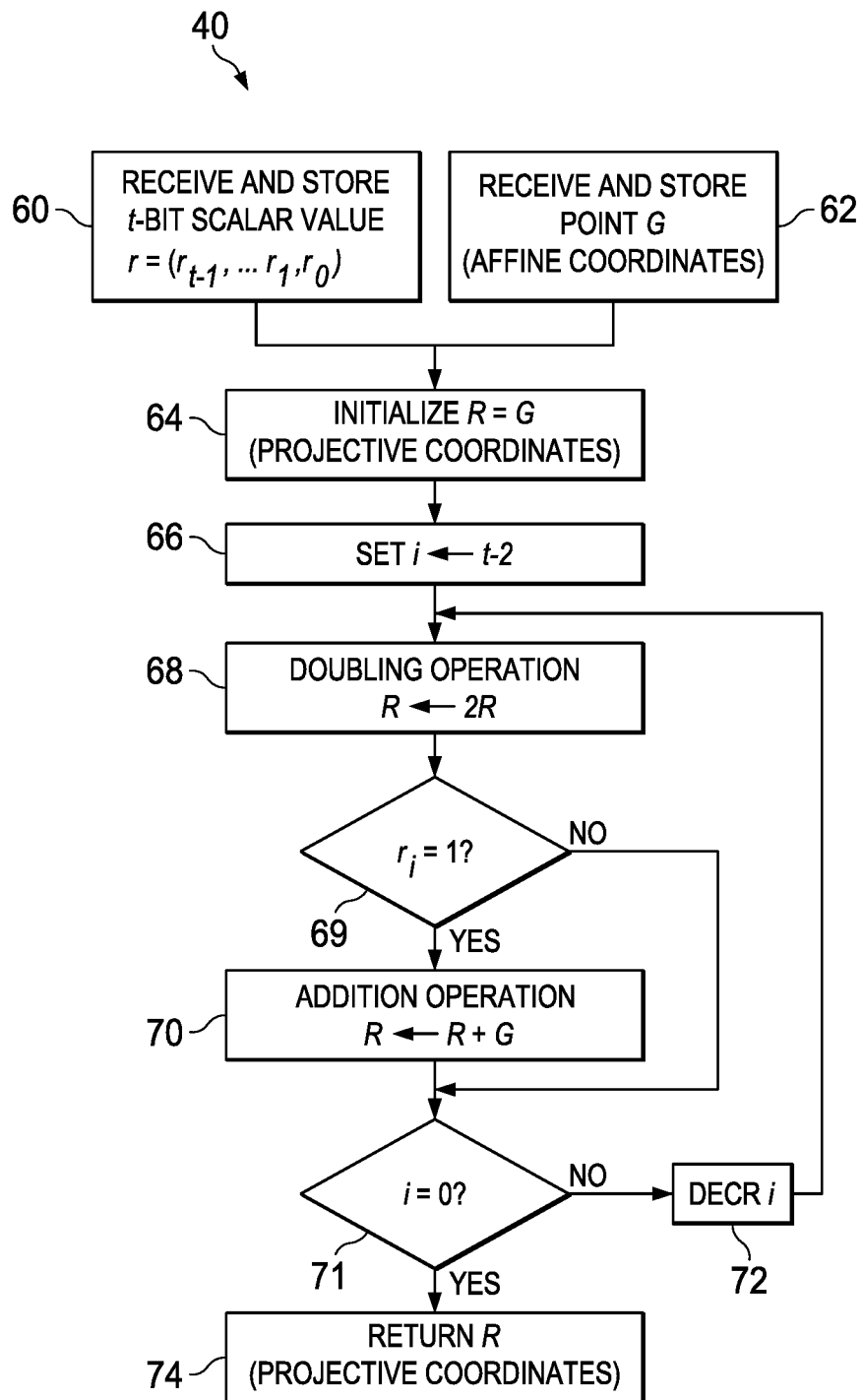
FIG. 8 is a flow diagram illustrating a finite field scalar multiplication according to an embodiment of the invention.

FIG. 8 illustrates a flow diagram corresponding to this pseudo-code sequence.

As evident from this pseudo-code, the execution loop iterates on the bits of random number r downward from its most significant bit i=t−1 to its least significant bit i=0. Iterating in this direction (MSB to LSB) allows maintaining the affine coordinates (Xg, Yg) of generator point G to be maintained as constants within register file 11 as shown. In this approach, the MSB of this random number is always a "1" value according to convention, and as such the addition (R←R+G) will always be performed for bit position t−1. Referring to the flow diagram of FIG. 8, this first addition is accomplished in process 64 by the initialization of the finite field product R that is to be produced from this finite field multiplication to a projective coordinate representation of generator point G.

As known in the art, finite field scalar multiplication of points expressed as affine coordinates typically involve divisions. The finite field inversions necessitated by these divisions are computationally costly operations. As such, it is useful to transform the affine coordinates to a more computationally favorable coordinate system, such as projective coordinates. As known in the art, various types of projective coordinates are known, including standard projective coordinates and Jacobian projective coordinates, to name two. In this embodiment, initialization process 64 is executed to transform the affine coordinates (Xg, Yg) of generator point G to Jacobian projective coordinate points, expressed as points of the form $(s^2 X, s^3 Y, sZ)$ for all s. Specifically for the case of the affine coordinates (Xg, Yg), the transformation is relatively simple, in that the Jacobian projective coordinates of a point (Xg, Yg) amount to the point (Xg, Yg, 1). Referring to the architecture diagram of FIG. 7, register location R0 will be initialized to the value Xg, register location R1 will be initialized to the value Yg, and register location R2 will be initialized to the value "1" (i.e., coordinate Zg), all in process 64. The iteration index i is then initialized to the bit position t−2 in process 66, and the iteration loop begins.

In process 68, the value of the product R is doubled. Doubling process 68 is performed for each bit position of random number r regardless of its bit value, to reflect the place value $(2^{i+1})$ of the previous bit position. The manner in which doubling process 68 is performed according to these embodiments will be described in further detail below, following this description of the overall finite field multiplication process flow. Decision 69 examines the value of bit position $r_i$ for the current value of the iteration index i. If bit $r_i$="1" (decision 69 is "yes"), addition process 70 is also performed to add the current (doubled) value of the product R with generator point G. The manner in which addition process 70 is performed according to these embodiments will be described in further detail below. If bit $r_i$="0" (decision 69 is "no"), addition process 70 is not performed.

Decision 71 then determines whether all bit positions of random number r have been processed (i.e., does i=0?). If not (decision 71 is "no"), iteration index i is decremented in process 72, the current value of product R is doubled in another instance of doubling process 68, and decision 69 and process 70 are repeated. If all bit positions of random number r have been processed (decision 71 is "yes"), the finite field scalar multiplication is complete, and the resulting product R is returned in process 74.

Other algorithms for performing a finite field scalar multiplication, besides that described above in connection with FIG. 8, are known in the art and may alternatively be used in connection with embodiments of this invention. For example, some algorithms for finite field scalar multiplication involve subtraction operations, and some algorithms may scan more than one bit of the scalar value at a time. It is contemplated that those skilled in the art having reference to this specification will be readily able to incorporate the embodiments described herein into these and other alternative algorithms, without undue experimentation.

As discussed above, embodiments of this invention implement finite field doubling process 68 and finite field addition process 70 so as to appear identical to one another, and thus avoid the vulnerability of the authenticated communications to side-channel attacks, such as by "snooping" of the noise and power characteristics of either or both of the communicating nodes. According to these embodiments, this is accomplished by the arrangement of the number and sequence of low-level operations (add, subtract, multiply, square) involved in a finite field addition to be identical to that involved in a finite field doubling. Of course, the operands applied to the low-level operations for an addition will differ from those applied to a doubling, to obtain the appropriate (and different) results of those two operations. But because the number and sequence of low-level operations are identical, the noise and power signature of the addition and doubling operations within processes such as the finite field scalar multiplication of process 40 will appear to be identical, from the viewpoint of a side-channel attack. As a result, it will be difficult if not impossible for the attacker to distinguish a "0" bit from a "1" bit in the scalar (e.g., random number r) from the noise and power emitted by the node carrying out the calculations.

The elliptic curve finite field doubling of a Jacobian projective point $(X_1, Y_1, Z_1)$ so as to derive point $(X_3, Y_3, Z_3)$ can be expressed as:

$$X_3=(3X_1^2+aZ_1^4)^2-8X_1Y_1^2$$

$$Y_3=(3X_1^2+aZ_1^4)(4X_1Y_1^2-X_3)-8Y_1^4$$

$$Z_3=2Y_1Z_1$$

The elliptic curve finite field addition of Jacobian projective points $(X_1, Y_1, Z_1)$ and $(X_2, Y_2, Z_2)$ to derive point $(X_3, Y_3, Z_3)$ is expressed as:

$$X_3=F^2-E^3-2AE^2$$

$$Y_3=F(AE^2-X_1)-CE^3$$

$$Z_3=Z_1Z_2E$$

where:

$$A=X_1Z_2^2$$

$$B=X_2Z_1^2$$

$$C=Y_1Z_2^3$$

$$D=Y_2Z_1^3$$

$$E=B-A$$

$$F=D-C$$

Because of the use of Jacobian projective coordinates, neither of the addition and doubling operations requires a division (i.e., inversion).

According to this embodiment, and for the example of FIGS. 7 and 8, load/store unit 62LS loads the following values into the register locations of register file 11 in initialization process 64:

| Register location | Contents |
| --- | --- |
| R0 | $X_1$ |
| R1 | $Y_1$ |
| R2 | $Z_1$ |
| R3 | $Z_1^2$ |
| R4 | $Z_1^3$ |
| R5 | [empty] |
| R6 | [empty] |
| R7 | [empty] |
| R8 | [empty] |
| CONSTANT Xg | $X_2$ |
| CONSTANT Yg | $Y_2$ |

In this embodiment, the values of $X_1, Y_1, Z_1$, and the square and cube of value $Z_1$, correspond to the Jacobian projective coordinates of generator point G, as discussed above relative to process 64. The values loaded (or previously stored) in register locations CONSTANT Xg and CONSTANT Yg are not used in doubling process 68, but will remain constant throughout the finite field scalar multiplication. And as noted above, the values stored in these locations (i.e., Xg, Yg) are the affine coordinate values of generator point G that is multiplied by the scalar random number r in the finite field multiplication performed in process 40.

Once these initial values are loaded into register file 11 in initialization process 64, the doubling of the current elliptic curve point expressed in register locations R0 through R4 is performed in process 68 by ALU 10 executing the following atomic pattern, i.e. sequence of operations (the unsubscripted X, Y, Z values referring to the values $X_1, Y_1, Z_1$):

TABLE 1

Doubling Atomic Pattern

| Operation | Register operations | Operation Type |
| --- | --- | --- |
| Y + Y | R5 = R1 + R1 | Add |
| R2 = 2Y · Z | R2 = R · 5R2 | Multiply |
| $Z_2 = (R2)^2$ | R6 = R2 · R2 | Multiply |
| $R7 = X - Z^2$ | R7 = R0 − R3 | Subtract |
| $a \cdot (X - Z^2)$ | R7 = a · R7 | Multiply |
| $Z_3 \cdot Z_2 \cdot R2$ | R4 = R6 R2 | Multiply |
| $X + Z^2$ | R8 = R0 + R3 | Add |
| $2Y^2$ | R5 = R5 · R1 | Multiply |
| $2Y^2 + 2Y^2$ | R3 = R5 + R5 | Add |
| $4Y^2 \cdot X$ | R1 = R5 · R0 | Multiply |
| $A = a \cdot (X - Z^2) \cdot (X + Z^2)$ | R7 = R7 · R8 | Multiply |
| $A^2$ | R8 = (R7)$^2$ | Square |
| $R0 = A^2 - 4Y^2X$ | R0 = R8 − R1 | Subtract |
| $4Y^2 \cdot 2Y^2$ | R5 = R5 · R3 | Multiply |
| $X_2 = R0 - 4Y^2X$ | R0 = R0 − R1 | Subtract |
| $R1 = 4Y^2X - X_2$ | R1 = R1 − R0 | Subtract |
| A · R1 | R8 = R7 · R1 | Multiply |
| $A \cdot R1 - 8Y^4$ | R1 = R8 − R5 | Subtract |
| | R3 = R6 | |

As evident from the above sequence, two of the operations use multiplications (i.e., using multiplier circuit 60c in ALU 10 of FIG. 7) rather than a squaring operation (i.e., using squaring circuit 60d in ALU 10) to calculate a square result, so that the power consumption and electromagnetic emanation profile (e.g., the side-channel signal) of the atomic pattern matches that of addition process 70, described below. And in the alternative to the squaring operation in this atomic pattern, a multiplication may instead be used. The result of these operations in carrying out doubling process 68, namely the doubled elliptic curve point 2R, resides in register locations R0 through R4 as the component values $X_1, Y_1, Z_1, Z_1^2, Z_1^3$, in preparation for the next operation (whether doubling or addition).

According to this embodiment, the addition of the current elliptic curve point expressed in register locations R0 through R4 with the generator point G, represented by its x and y components Xg, Yg, respectively, that are stored in the CONSTANT Xg and CONSTANT Yg register locations, is performed in process 70 by ALU 10 executing the following atomic pattern (the unsubscripted X, Y, Z values again referring to the values $X_1, Y_1, Z_1$):

TABLE 2

Addition Atomic Pattern

| Operation | Register operations | Operation Type |
|---|---|---|
| (don't care) + (don't care) | "+" | Add (dummy) |
| $Xg \cdot Z^2$ | R3 = Xg · R3 | Multiply |
| $Yg \cdot Z^3$ | R4 = Yg · R3 | Multiply |
| $E = B - X$ | R3 = R3 − R0 | Subtract |
| $E^2$ | R7 = R3 · R3 | Multiply |
| $A \cdot E^2$ | R5 = R0 · R7 | Multiply |
| $A \cdot E^2 + A \cdot E^2$ | R6 = R5 + R5 | Add |
| $E^2 \cdot E$ | R8 = R7 · R3 | Multiply |
| $R1 = E^3 + 2AE^2$ | R6 = R8 + R6 | Add |
| $Y \cdot E^3$ | R8 = R1 · R8 | Multiply |
| $Z_3 = Z \cdot E$ | R2 = R2 · R3 | Multiply |
| $(Z_3)^2$ | R3 = (R2)$^2$ | Square |
| $F = Yg \cdot Z^3 - Y$ | R1 = R4 − R1 | Subtract |
| $F^2$ | R8 = R1 · R1 | Multiply |
| $X_3 = F^2 - R1$ | R0 = R7 − R6 | Subtract |
| $R1 = A \cdot E^2 - X_3$ | R7 = R5 − R0 | Subtract |
| $F \cdot R1$ | R1 = R1 · R7 | Multiply |
| $F \cdot R1 - Y \cdot E^3$ | R1 = R1 − R8 | Subtract | where the values shown as A, E, and F are as defined above in connection with the Jacobian projective calculations for finite field addition. The first operation is a "dummy" add, in that ALU 10 performs an addition without regard to the values of its operands or of the result. As evident from the above sequence, two of the operations use a multiplication rather than a squaring operation to calculate a square result, to match the side-channel signal of this addition atomic pattern with that of doubling process 68 described above. And in the alternative to the squaring operation in this atomic pattern, a multiplication may instead be used. The result of these operations in carrying out addition process 70, namely the elliptic curve point at the sum of the R and G points, resides in the contents of registers R0 through R4, as the component values $X_1, Y_1, Z_1, Z_1^2, Z_1^3$ for the next operation, which will be a doubling according to the process flow of FIG. 8.

A comparison of the sequences of operation types in the atomic patterns of doubling process 68 and addition process 70 shows that the two processes use exactly the same sequence of adds, subtracts, multiplications, and squaring operations as one another. Furthermore, doubling process 68 and addition process 70 each employ a total of only three adds, five subtracts, nine multiplies, and one squaring, which is believed to be fewer operations than in conventional atomic patterns for these operations. As a result, this embodiment provides an especially efficient method of carrying out these computations in a digital system, such as in nodes of a networked system as described above relative to FIG. 1.

It is contemplated that a finite field subtraction process may be useful in some elliptic curve authentication and encryption algorithms and sequences, for example in replacing one or more instances of addition process 70 in algorithms following computational process flows different from that shown in FIG. 8. According to another embodiment, a subtraction process is provided that involves the same number and sequence of low-level operations (i.e., add, subtract, multiply, squaring) as doubling and addition processes 68, 70, and thus in a manner suitable for use in carrying out sensitive calculations that are not vulnerable to side-channel attack.

According to this embodiment, a subtraction to produce a difference of the current elliptic curve point expressed in register locations R0 through R4 and the generator point G, represented by its x and y components Xg, Yg, respectively, that are stored in the CONSTANT Xg and CONSTANT Yg register locations, is performed by ALU 10 executing the following atomic pattern (the unsubscripted X, Y, Z values again referring to the values $X_1, Y_1, Z_1$):

TABLE 3

Subtraction Atomic Pattern

| Operation | Register operations | Operation Type |
|---|---|---|
| (don't care) + (don't care) | "+" | Add (dummy) |
| $Xg \cdot Z^2$ | R3 = Xg · R3 | Multiply |
| $Yg \cdot Z^3$ | R4 = Yg · R3 | Multiply |
| $E = B - X$ | R3 = R3 − R0 | Subtract |
| $E^2$ | R7 = R3 · R3 | Multiply |
| $A \cdot E^2$ | R5 = R0 · R7 | Multiply |
| $A \cdot E^2 + A \cdot E^2$ | R6 = R5 + R5 | Add |
| $E^2 \cdot E$ | R8 = R7 · R3 | Multiply |
| $R1 = E^3 + 2AE^2$ | R6 = R8 + R6 | Add |
| $Y \cdot E^3$ | R8 = R1 · R8 | Multiply |
| $Z_3 = Z \cdot E$ | R2 = R2 · R3 | Multiply |
| $(Z_3)^2$ | R3 = (R2)$^2$ | Square |
| $F = Yg \cdot Z^3 + Y$ | R1 = R4 + R1 | Add |
| $F^2$ | R8 = R1 · R1 | Multiply |
| $X_3 = F^2 - R1$ | R0 = R7 − R6 | Subtract |
| $R1 = A \cdot E^2 - X_3$ | R7 = R5 − R0 | Subtract |
| $F \cdot R1$ | R1 = R1 · R7 | Multiply |
| $F \cdot R1 - Y \cdot E^3$ | R1 = R1 − R8 | Subtract |

The only difference between this sequence and that of Table 2 for addition process 70 is in the thirteenth step ($F=Yg \cdot Z^3 + Y$), which is an addition for this subtraction process while the corresponding thirteenth step is a subtraction in addition process 70 of Table 2. It is contemplated that the side-channel signals of the addition and subtraction atomic patterns according to this embodiment will still very closely match one another, despite that difference in the thirteenth operation.

It will be recognized, by those skilled in the art having reference to this specification, that these sequences of operations for doubling, addition, and subtraction may readily be used in other process flows for performing finite field scalar multiplication and similar operations, with such use attaining similar benefits of reduced vulnerability to side-channel attach and efficient implementation and performance.

For example, other approaches to performing finite field scalar multiplication are contemplated. One such approach is for the iteration loop involved in the multiplication of FIG. 9 described above to proceed bit-by-bit from LSB to MSB of the scalar value, as evident from the following pseudo-code:

```
R ← 0                    # initialize result R to zero
for i from 0 to t−1, do:  # for each bit position in r, beginning with LSB
    if r_i = 1, then R ← R + G   # add G to accumulator for "1" bit in r_i
    G ← 2G               # double G for next bit (2^{i+1}) position in r
    loop                 # increment index i = i+1
return d                 # output the result R
```

It is of course also contemplated that other algorithms for carrying out finite field calculations involving sensitive numbers may similarly utilize the matching atomic patterns to perform doubling and addition, and subtraction if desired, so as to efficiently calculate the results while reducing vulnerability to side-channel attack.

According to these embodiments, therefore, atomic patterns for addition and doubling operations, and perhaps subtraction operations, are arranged so as to exhibit very similar power and noise signatures as one another, so as to prevent a side-channel attacker from readily distinguishing additions from doublings. This cloaking of these operations ensure that such attackers will be unable to distinguish "1" bits from "0" bits in the sequence of the number involved in the computation, and thus protect sensitive values from which private keys and other information upon which the security of the communications depend.

Embodiments of this invention therefore address the technological problem of efficiently executing finite field arithmetic operations involved in private key authentication according to an ECC algorithm, using scalar finite field operations that are identical, from a power consumption and electromagnetic emanation standpoint, regardless of the bit values of the scalar. It is further contemplated that these embodiments provide such a countermeasure to side-channel attack in a way that is particularly efficient from a computational cost and power consumption standpoint, by requiring fewer low-level operations than conventional techniques. As such, these embodiments provide effective and efficient countermeasures to side-channel attacks. Accordingly, it is anticipated that these embodiments will be especially beneficial when implemented into remote sensors and controllers, such as in networked systems within the so-called "Internet of Things", and in other power-sensitive (e.g., battery-powered or otherwise remotely-powered) applications.

While one or more embodiments have been described in this specification, it is of course contemplated that modifications of, and alternatives to, these embodiments, such modifications and alternatives capable of obtaining one or more of the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method comprising:
   initializing one or more memory locations storing components of a sum, the sum representative of a point in a finite field; and
   operating digital logic circuitry to execute a plurality of operations comprising, for each of a plurality of bit positions in a scalar:
      doubling an operand representative of the sum or a multiplicand;
      in response to determining that the bit position has a "1" value, adding first and second operands, the first and second operands representative of the sum and the multiplicand; and
      advancing to a next bit position in the scalar;
   wherein the adding the first and second operands is executed using an atomic pattern comprising:
      a first addition;
      a first multiplication after the first addition;
      a second multiplication after the first multiplication;
      a second addition after the second multiplication;
      a third multiplication after the second addition;
      a fourth multiplication after the third multiplication;
      a third addition after the fourth multiplication;
      a fifth multiplication after the third addition;
      a fourth addition after the fifth multiplication;
      a sixth multiplication after the fourth addition;
      a seventh multiplication after the sixth multiplication;
      an eighth multiplication after the seventh multiplication;
      a fifth addition after the eighth multiplication;
      a ninth multiplication after the fifth addition;
      a sixth addition after the ninth multiplication;
      a seventh addition after the sixth addition;
      a tenth multiplication after the seventh addition; and
      an eighth addition after the tenth multiplication.

2. The method of claim 1, wherein the second and fifth multiplications are squaring operations.

3. The method of claim 2, wherein the second and fifth through eighth additions comprises a subtracting operation.

4. The method of claim 1, wherein the second and fifth through eighth additions comprises a subtracting operation.

5. The method of claim 1, wherein the digital logic circuitry comprises a processor and a register file;
   wherein the initializing step comprises:
   loading projective coordinates corresponding to the multiplicand into first, second, and third register locations of the register file;
   wherein each of the addition and multiplication operations that comprise the doubling and addition steps operate on operands comprising contents stored in the register file;
   wherein results of the doubling and adding steps are stored in the first, second, and third register locations;
   and wherein the operating step is performed for each of the second most significant to least significant bit positions of the scalar.

6. The method of claim 5, wherein constant register locations store coordinates of the multiplicand as constants;
   wherein the doubling step doubles the sum;
   and wherein the first operand of the adding step corresponds to the sum and the second operand of the adding step corresponds to the contents of the constant register locations.

7. The method of claim 1, wherein the multiplicand represents a point in a cyclic group that is a subset of points on an elliptic curve over the finite field, the elliptic curve represented by an equation of the short Weierstrass form.

8. The method of claim 1, wherein the plurality of operations executed by the digital logic circuitry further comprises subtracting the first and second operands using an atomic pattern consisting of:
   a first addition;
   then a first multiplication followed by a second multiplication;
   then a second addition;
   then a third multiplication followed by a fourth multiplication;
   then a third addition;
   then a fifth multiplication;
   then a fourth addition;
   then a sixth multiplication followed by a seventh multiplication followed by an eighth multiplication;
   then a fifth addition;
   then a ninth multiplication;
   then a sixth addition followed by a seventh addition;
   then a tenth multiplication; and
   then an eighth addition.

9. A method comprising:
generating a private/public key pair;
selecting a random number r; and
executing a finite field scalar multiplication of a generator point in a finite field by the random number r to calculate a product point R in the finite field, comprising:
  initializing one or more memory locations storing components of a sum, the sum representative of a point in the finite field; and
  operating digital logic circuitry to execute a plurality of operations comprising, for each of a plurality of bit positions in the random number r:
    doubling an operand representative of the sum or the generator point;
    in response to determining that the bit position has a "1" value, adding first and second operands, the first and second operands representative of the sum and the generator point; and
    advancing to a next bit position in the random number r;
  computing a signature component by combining an inverse modulo of the random number r, a coordinate component of the product point R, and the private key k; and
  transmitting a digital signature comprising the coordinate component of the product point R and the computed signature component.

10. The method of claim 9, wherein the generator point represents a point in a cyclic group that is a subset of points on an elliptic curve over the finite field, the elliptic curve represented by an equation of the short Weierstrass form.

11. The method of claim 9, wherein the plurality of operations executed by the digital logic circuitry further comprises subtracting the first and second operands using an atomic pattern consisting of:
  a first addition;
  then a first multiplication followed by a second multiplication;
  then a second addition;
  then a third multiplication followed by a fourth multiplication;
  then a third addition;
  then a fifth multiplication;
  then a fourth addition;
  then a sixth multiplication followed by a seventh multiplication followed by an eighth multiplication;
  then a fifth addition;
  then a ninth multiplication;
  then a sixth addition followed by a seventh addition;
  then a tenth multiplication; and
  then an eighth addition.

12. The method of claim 9, wherein the doubling step is executed using an atomic pattern consisting of:
  a first addition;
  a first multiplication after the first addition;
  a second multiplication after the first multiplication;
  a second addition after the second multiplication;
  a third multiplication after the second addition;
  a fourth multiplication after the third multiplication;
  a third addition after the fourth multiplication;
  a fifth multiplication after the third addition;
  a fourth addition after the fifth multiplication;
  a sixth multiplication after the fourth addition;
  a seventh multiplication after the sixth multiplication;
  an eighth multiplication after the seventh multiplication;
  a fifth addition after the eighth multiplication;
  a ninth multiplication after the fifth addition;
  a sixth addition after the ninth multiplication;
  a seventh addition after the sixth addition;
  a tenth multiplication after the seventh addition; and
  an eighth addition after the tenth multiplication.

13. The method of claim 12, wherein the second and fifth multiplications are squaring operations.

14. The method of claim 13, wherein the second and fifth through eighth additions comprises a subtracting operation.

15. The method of claim 12, wherein the second and fifth through eighth additions comprises a subtracting operation.

16. The method of claim 9, wherein the digital logic circuitry comprises a processor and a register file;
  wherein the initializing step comprises:
    loading projective coordinates corresponding to the generator point into first, second, and third register locations of the register file;
  wherein each of the addition and multiplication operations that comprise the doubling and addition steps operate on operands comprising contents stored in the register file;
  wherein results of the doubling and adding steps are stored in the first, second, and third register locations;
  and wherein the operating step is performed for each of the second most significant to least significant bit positions of the random number r.

17. The method of claim 9, further comprising:
  storing x and y coordinates of the generator point in memory locations;
  wherein the doubling step doubles the sum;
  and wherein the first operand of the adding step corresponds to the sum, and the second operand of the adding step corresponds to the x and y coordinates of the generator point.

* * * * *